(12) United States Patent
Garcia

(10) Patent No.: US 6,177,203 B1
(45) Date of Patent: Jan. 23, 2001

(54) SIMULTANEOUS DIFFUSION BONDING OF AN ARRAY OF LIKE PARTS

(75) Inventor: Juan Alfonso Garcia, Tucson, AZ (US)

(73) Assignee: Opto Power Corporation, Tucson, AZ (US)

( * ) Notice: Under 35 U.S.C. 154(b), the term of this patent shall be extended for 0 days.

(21) Appl. No.: 09/189,952

(22) Filed: Nov. 12, 1998

(51) Int. Cl.$^7$ ................................................. B21D 28/00
(52) U.S. Cl. ........................ 428/596; 428/45; 428/134; 428/636; 428/637; 428/638; 428/596; 428/577; 428/571; 428/572; 228/190; 228/193; 432/253; 266/285; 266/274; 165/81; 165/82; 165/166; 165/169
(58) Field of Search ..................................... 228/190, 193; 428/636, 637, 638, 596, 571, 572, 577, 45, 134; 432/253; 266/285, 274; 165/81, 82, 167, 169

(56) References Cited

U.S. PATENT DOCUMENTS

| | | | |
|---|---|---|---|
| 3,680,576 | * | 8/1972 | Kiwak ................................. 137/833 |
| 4,143,194 | * | 3/1979 | Wihksne ................................ 428/81 |
| 4,436,779 | * | 3/1984 | Menconi et al. ..................... 428/169 |
| 4,468,910 | * | 9/1984 | Morrison ................................ 52/591 |
| 4,899,756 | * | 2/1990 | Sonek .............................. 128/662.05 |
| 4,917,613 | * | 4/1990 | Kabadi ................................... 439/67 |
| 5,303,824 | * | 4/1994 | Kohn .................................. 206/449 |
| 5,482,198 | * | 1/1996 | Kohn .................................... 228/6.2 |
| 5,655,702 | * | 8/1997 | Anderson et al. ................... 228/159 |
| 5,812,378 | * | 9/1998 | Fjelstad et al. ..................... 361/769 |
| 5,934,914 | * | 8/1999 | Fjelstad et al. ........................ 438/82 |
| 6,003,754 | * | 12/1999 | Rhodes ................................ 228/106 |

FOREIGN PATENT DOCUMENTS

| | | | |
|---|---|---|---|
| 5523825 | * | 2/1980 | (JP) . |
| 405133562 | * | 5/1993 | (JP) . |

\* cited by examiner

*Primary Examiner*—Deborah Jones
*Assistant Examiner*—Lymarie Miranda
(74) *Attorney, Agent, or Firm*—Herbert M. Shapiro

(57) ABSTRACT

Diffusion bonding techniques are extended to the simultaneous bonding of an array of multilevel piece parts. The problems of uneven expansion and contraction of different levels of different piece parts in the array are obviated by positioning each level of the array within a frame. The stack of frames is pinned in one corner. The opposite corner of the array has a slot at a 45° angle with respect to the x and y axes of the array. The slot engages a pin and allows the entire array to expand and contract along the slot in a manner to maintain the registration of features between respective levels of each piece part.

4 Claims, 7 Drawing Sheets

SIMULTANEOUS DIFFUSION BONDING OF AN ARRAY OF LIKE PARTS

FIELD OF THE INVENTION

This invention relates to diffusion bonding techniques and more particularly to apparatus which adapts such techniques to the simultaneous bonding of each of an array of parts such as laser diodes heat sinks.

BACKGROUND OF THE INVENTION

Diffusion bonding techniques are well known. Although such techniques are quite useful, they are limited to bonding of single items, mostly small but also, to some extent, to single relatively large area items. The techniques have not been used for simultaneous bonding of an array of like parts.

BRIEF DESCRIPTION OF THE INVENTION

In accordance with the principles of this invention, diffusion bonding techniques are extended to the simultaneous bonding of like parts such as multilayer-layer, heat sink assemblies for laser diodes. The invention is based on the recognition that changes in temperature during processing of an array of parts caused expansion and contraction of component layers of the parts in different portions of the array. This problem was overcome by providing a frame about the array of parts where the frame has a small hole at one corner of the frame and includes a slot at the opposite corner of the frame. The slot is aligned at a 45° axis and, accordingly, in response to any expansion or contraction during diffusion bonding results in the absence of misalignment of component layers in the parts of the array.

DETAILED DESCRIPTION OF AN ILLUSTRATIVE EMBODIMENT OF THE INVENTION

Figure 1:
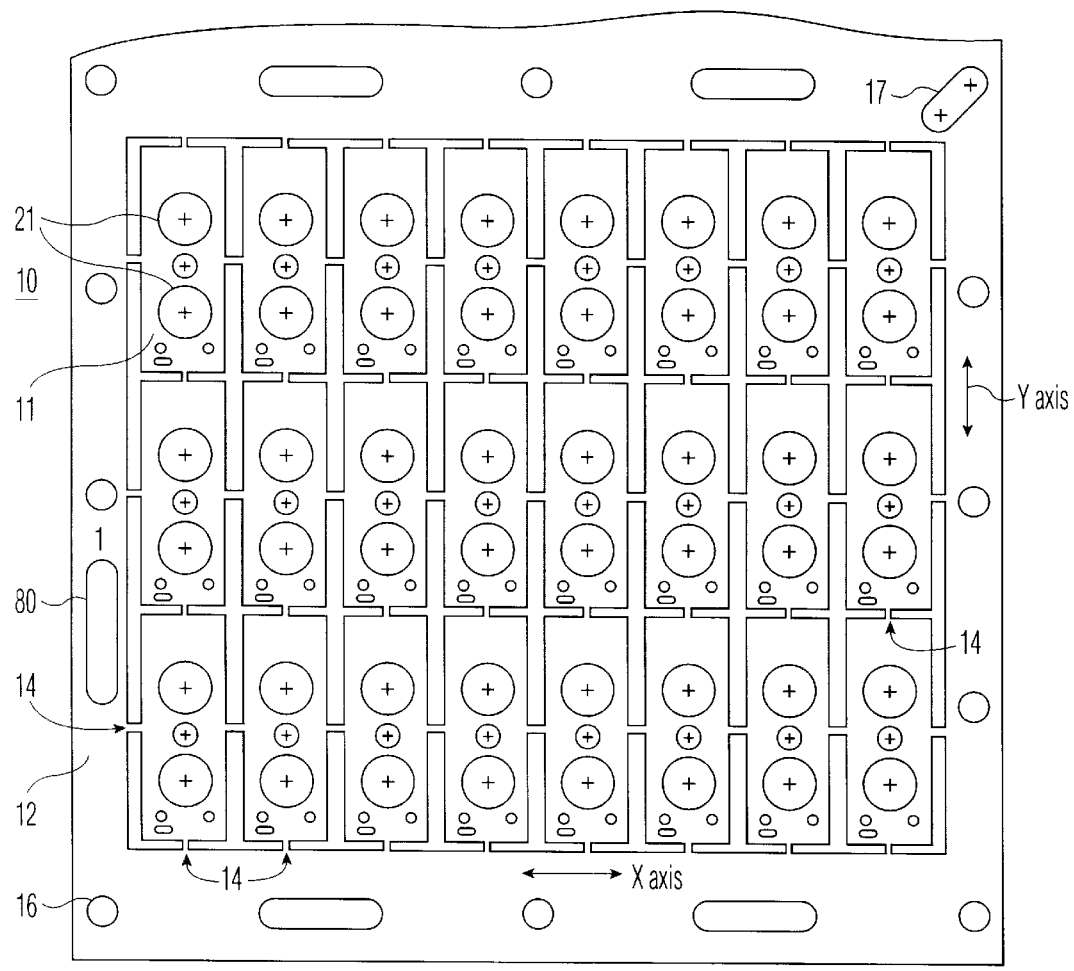
FIG. 1 is a top view of an array of laser diode heat sinks subassemblies in accordance with the principles of this invention.

FIG. 1 shows an array 10 of twenty-four identical heat sinks assemblies 11. The heat sink assemblies are maintained in a plane by a frame 12 which surrounds the array and by tabs 14 which interconnect the assemblies in the rows (i.e. x axis) and the columns (i.e. y axis) of the array.

The frame includes a small hole 16 at the corner at the lower left of the frame as viewed in FIG. 1. The frame also includes a slot 17 at the corner at the upper right of the frame as viewed. Hole 16 and slot 17 are important features of the frame because they permit the array to adjust uniformly to any expansion and contraction of the piece parts during the temperature excursions which occur during diffusion bonding. In the absence of hole 16 and slot 17, the temperature excursions during bonding of multilayer parts of the array causes unequal misalignment in different portions of the layers resulting in a significant reduction in yield.

The necessity for maintaining the alignment of the layers of the piece parts is particularly useful for small solid state multilayer layer piece parts such as the illustrative heat sink described herein. Specifically, FIGS. 2 through 6 show top views of the sequence of layers to be aligned and simultaneously diffusion bonded for forming the array of heat sinks herein. The layers are stacked in a jig (not shown) which includes pins which insert through hole 16 and slot 17. The same numbers are used for each of the layers to designate common features in order to avoid confusion and to simplify comparisons between layers.

Figure 2:
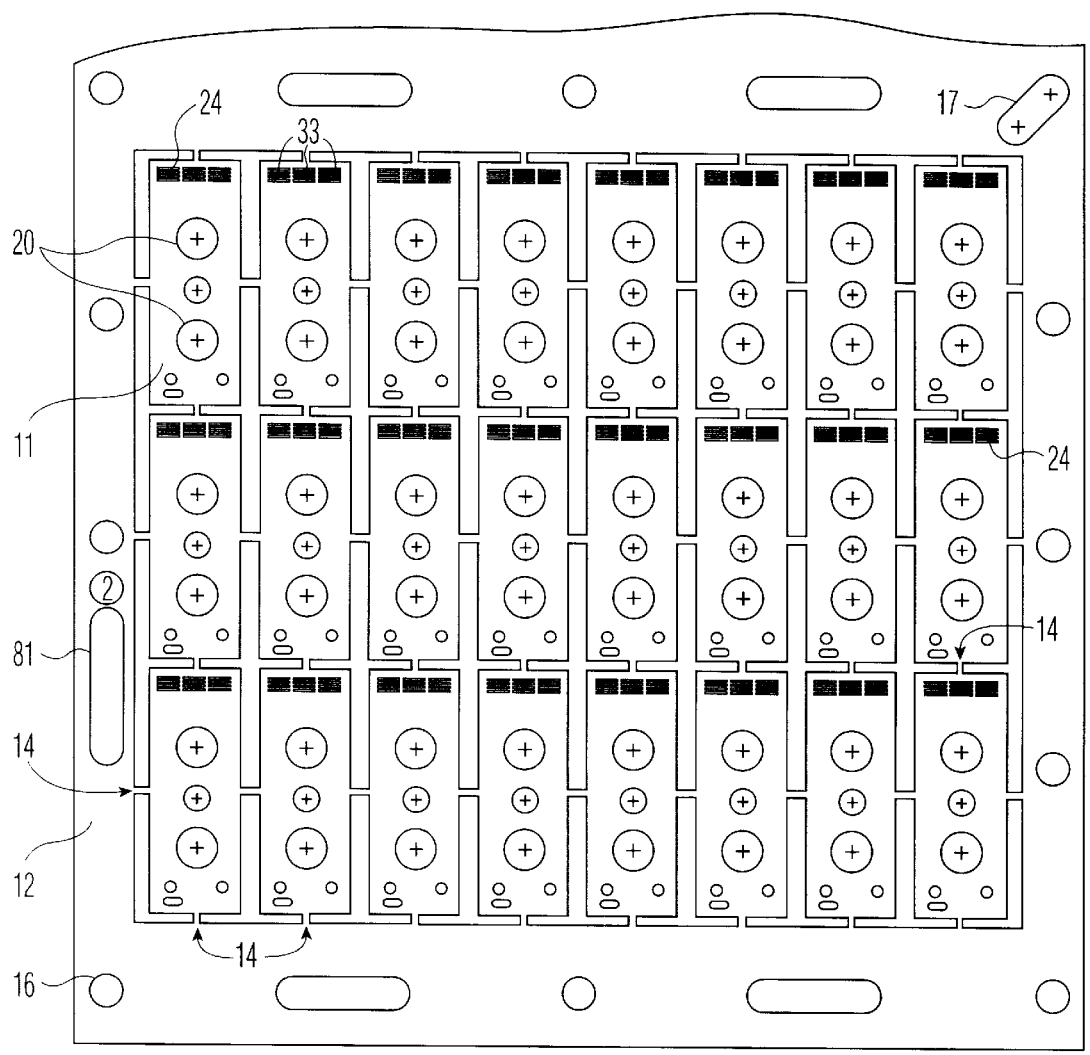
FIGS. 2–6 are top views of the component layers of the heat sink of the array of FIG. 1.

FIG. 1 can be taken to represent the array of completed heat sinks or, alternatively, the top subassembly of the sequence of layers in the heat sinks. FIG. 2 represents the next lower layer (or subassembly). Note that the holes 20 in each of the heat sink subassembly of FIG. 2 (shown at the upper left in FIG. 2) have smaller diameters than the holes 21 of FIG. 1 with which they are aligned. Note also that each heat sink in the subassembly of FIG. 2 includes a grating 24 which will be seen to represent a significant feature of a heat sink herein.

Figure 3:
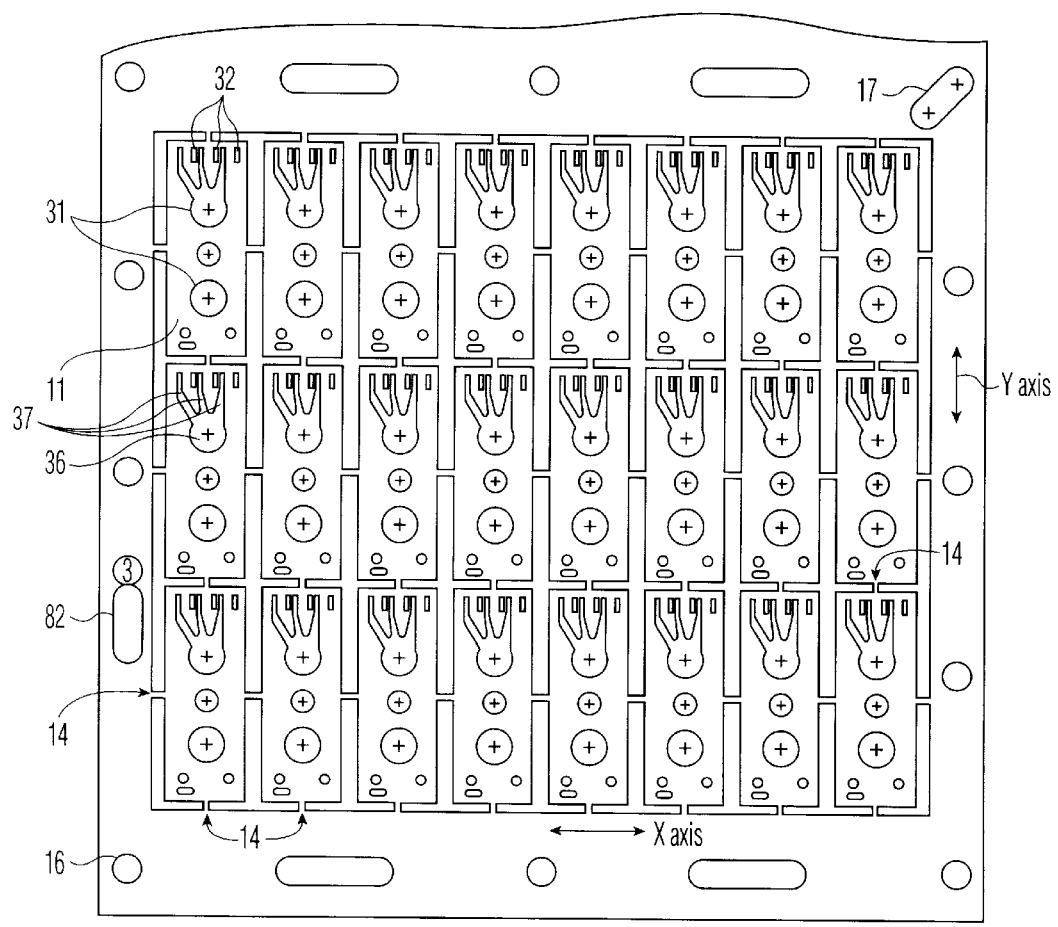

FIG. 3 represents the next lower subassembly of the array of heat sinks. Each heat sink subassembly in FIG. 3 includes holes 31 having diameters equal to that of holes 20 of FIG. 2 and are aligned with those holes. Each heat sink subassembly also includes three slots 32 which align illustratively with the right side of grating sections 33 of the corresponding heat sink subassembly of FIG. 2. Each heat sink subassembly of FIG. 3 also includes a recess 36 having three upward extensions 37 which align with the left side of the grating sections of the corresponding heat sink subassembly of FIG. 2.

Figure 4:
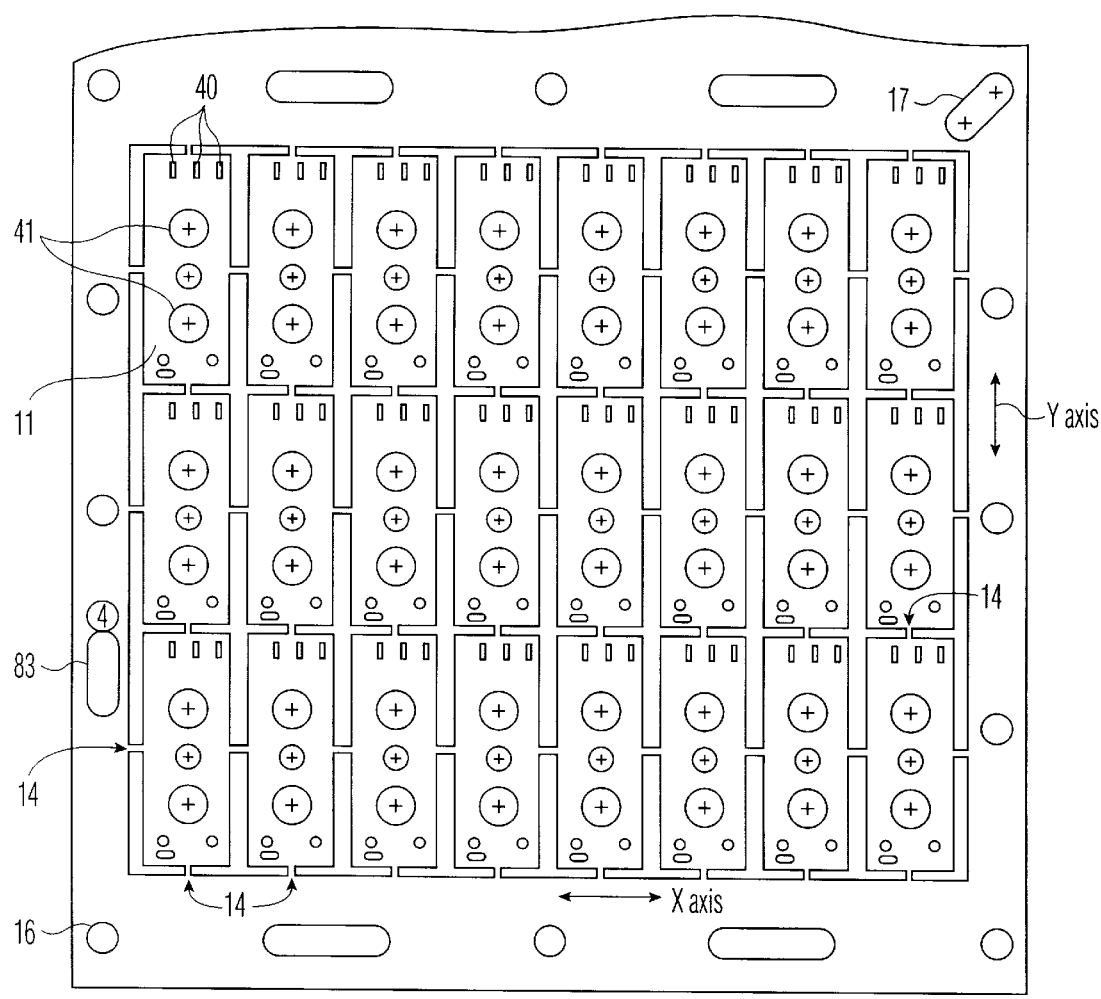

FIG. 4 shows the next lower heat sink subassembly layer. Each heat sink subassembly in the layer of FIG. 4 includes a set of three slots 40 which align with the slots 32 of the corresponding heat sink subassembly of the layer of FIG. 3. Holes 41 in each of the heat sink subassemblies have diameters equal to that of holes 20 of FIG. 2.

Figure 5:
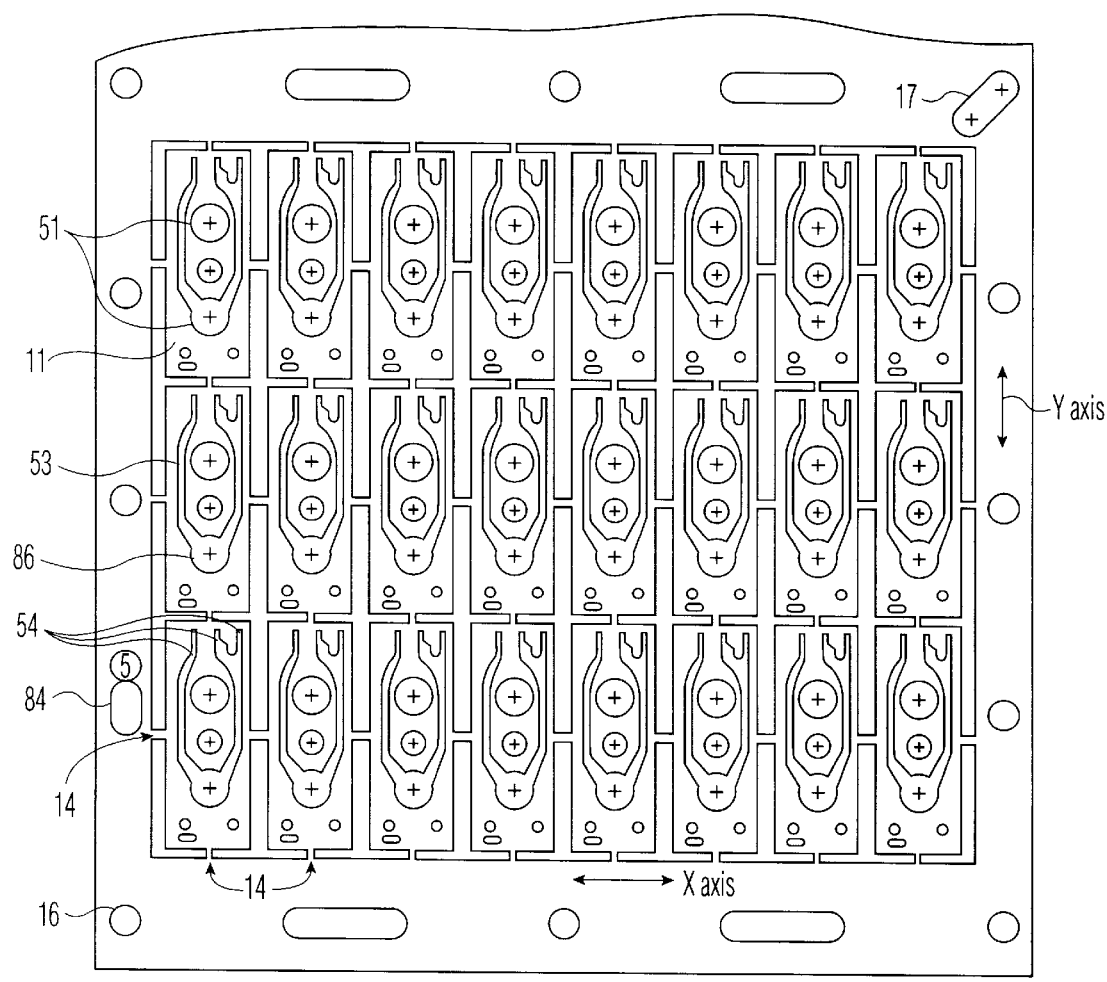

FIG. 5 shows the next lower layer of the heat sink of FIG. 1. Each heat sink subassembly in the layer of FIG. 5 includes holes 51 having diameters equal to the diameter of holes 20 of FIG. 2. In addition each heat sink subassembly of the layer of FIG. 5 includes a recess 53 which extends upwards (as viewed) from a hole 51 forming two arms which terminate in a set of three fingers 54. The three fingers are aligned with the right side of the grating sections of the corresponding heat sink subassembly (24) shown in FIG. 2.

Figure 6:
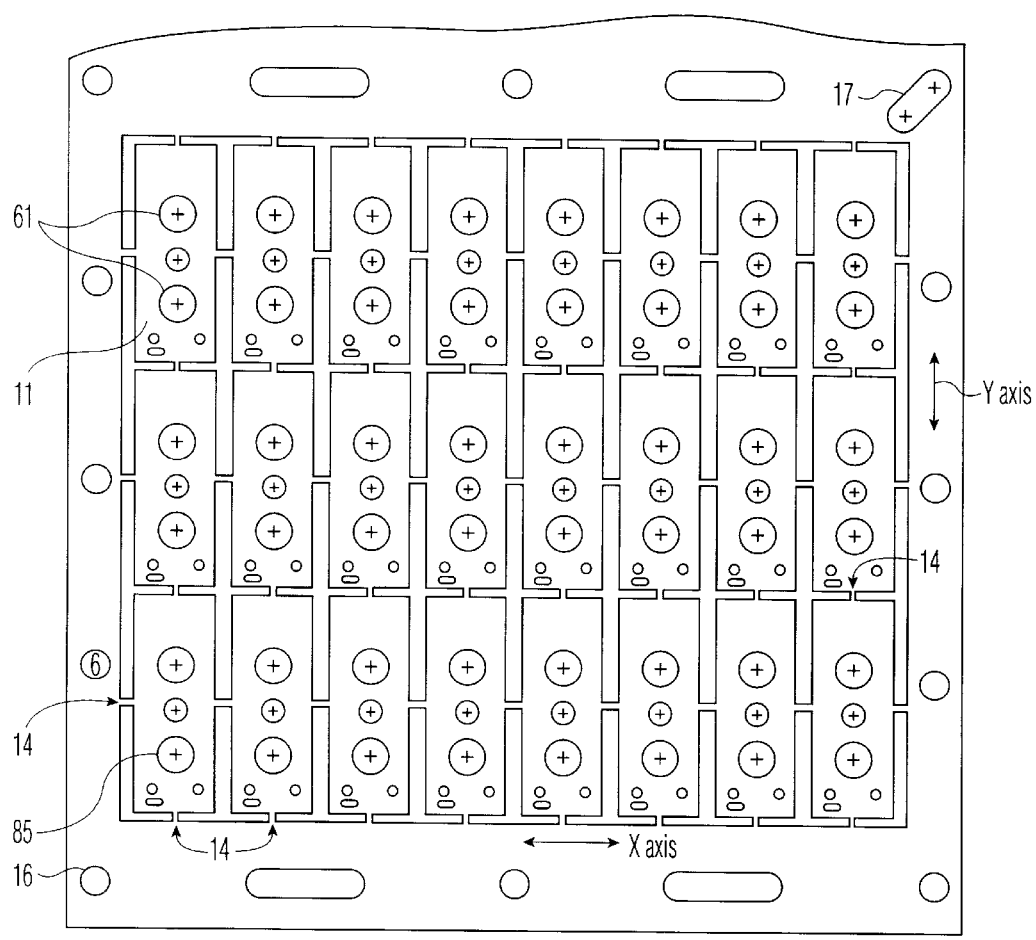

FIG. 6 is the lowest layer of heat sink subassemblies. This layer includes holes 61 having diameters equal to those of holes 20 of FIG. 2.

Figure 7:
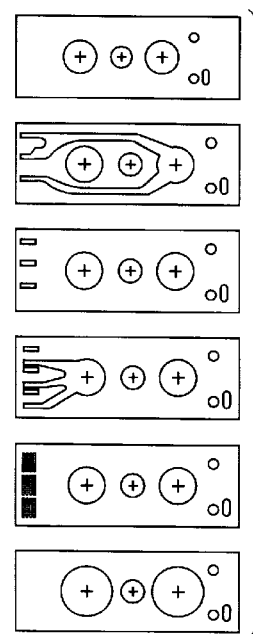
FIG. 7 is a set of subassemblies for a single heat sink of the array of heat sinks of FIGS. 1–6.

The layers of FIGS. 1–6 are stacked and held in alignment by pins (not shown) which insert in hole 16 and slot 17. FIG. 7 depicts the set of subassemblies for a single heat sink of the array of heat sinks.

Figure 8:
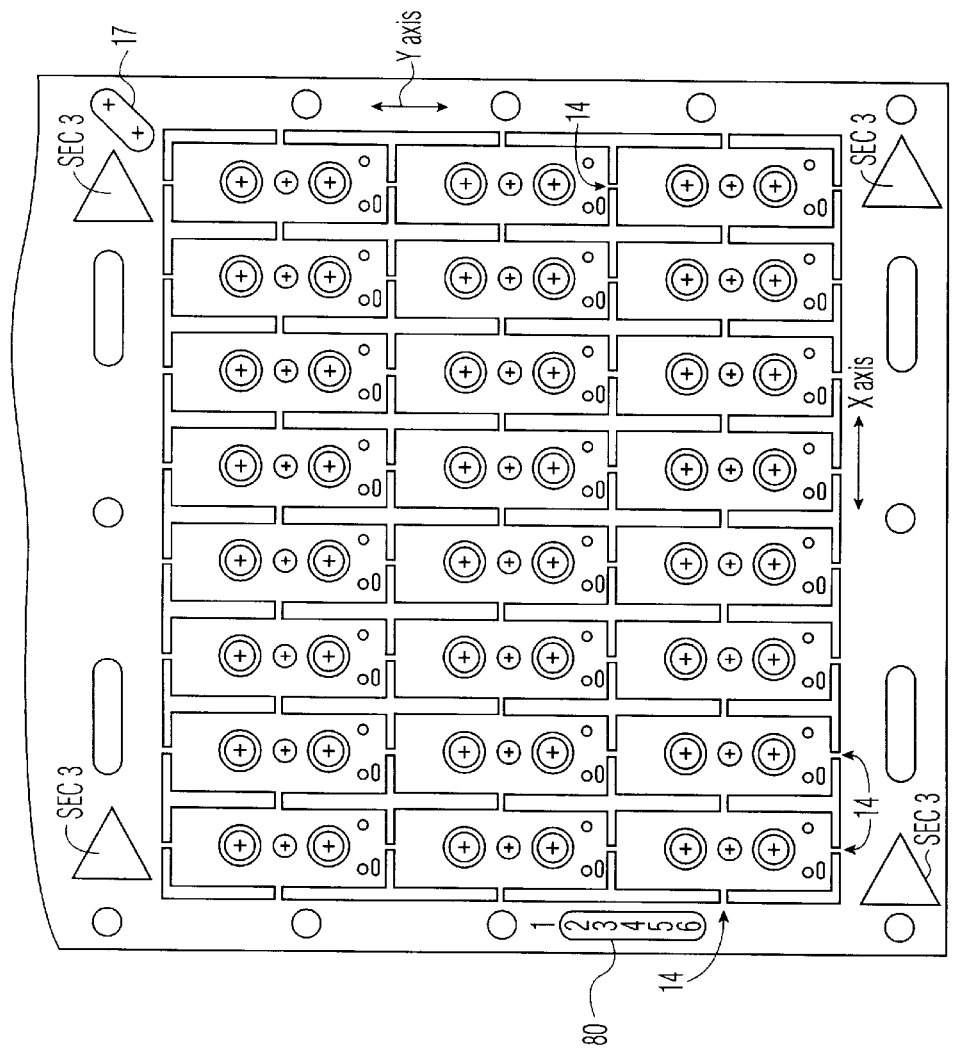
FIG. 8 is a top view of an array of integrated heat sinks.

FIG. 8 is a top view of the resulting array of heat sink subassemblies. A slot 80 is provided to expose the numerals 1 through 6 which appear to the left on the layers of FIGS 1–6, specifically, each layer of FIGS 1–6 includes a numeral designating the layer and a slot which permits the numerals designating the lower layer designations to be viewed via slot 80 in the top layer of each heat sink. The viewing slots are designated 80, 81, 82, 83, and 84 in FIGS 1, 2, 3, 4, and 5 respectively. Each slot is associated with a numeral designating the layer and the slots are progressively smaller. There is no such slot for the layer of FIG. 6. Only the numeral is shown. The sequence of numerals is exposed through slot 80 of FIG. 1 and can be confirmed to be in the proper sequence before being subjected to the diffusion bonding process.

A recitation of the various dimensions herein is helpful in appreciating the effects of slight misalignment in the various layers. The layers of FIGS 2, 3, 4 and 5 have thicknesses of 0.010 inch and is made of copper. The layers of FIGS 1 and 6 have thicknesses of 0.020 inch and also are made of copper. Hole 21 of FIG. 1 has a diameter of 0.213 inch on 0.470 centers. Holes 20 of FIG. 2 have diameters of 0.200 and are an 0.470 centers. The grating (24) of FIG. 2 has dimensions of 0.391×0.070, twelve openings being shown therein. Each opening has dimensions of 0.125×0.010. The recesses 31 of FIG. 3 are etched to a depth of 0.010. Each piece part in each of the layers of FIGS 1–6 has dimensions of 0.490×1.230×0.080 when the individual heat sinks are separated from the array.

Each heat sink provides internal paths for coolant to move to and from the gratings of FIG. 2. In practice, laser diodes are positioned in contact with the heat sink in registry with the gratings. A coolant is introduced at hole 85 of FIG. 6 of a heat sink, moves through hole 86 (FIG. 5) in registry with the inlet hole 85. The coolant moves through recess 53 (FIG. 5), moves through slots 40 (FIG. 4), moves through slots 32 (FIG. 3), moves through grating 24 (FIG. 2) from right to left, moves through 37 (FIG. 3) and exits at 36 (FIG. 3). It is clear that slight misalignment would cause unwanted obstructions in the fluid paths of the heat sinks.

The stack of layers is placed in a diffusion bonding fixture (not shown) which has a pair of pins positioned to engage hole 16 and slot 17. Hole 16 has a diameter of 0.196 inch and slot 17 has a width of 0.196 inch and a length of 0.439 in the illustrative embodiment. The pins which engage hole 16 and slot 17 have diameters to maintain the stack corner at hole 16 in a fixed position and to allow movement of the opposite corner along the axis of the slot. Because of the frame with one corner in a fixed position and a properly oriented slot in the opposite corner, the alignment between the several layers of the heat sink array is maintained during expansion and contraction during temperature excursions.

What is claimed is:

1. An assemblage comprising a plurality of layers, each of said layers comprising an X Y array of piece parts, the piece parts in each of said plurality of layers being different from piece parts in adjacent ones of said plurality of layers, the like positioned piece parts in each of said layers being aligned and in intimate contact with one another, each of said layers including a frame thereabout, the frames of each of said layers being aligned with one another to form a stack, each of said frames including a hole in a first corner and a slot in an opposite corner, said slot being aligned along the 45° angle with respect to the X and Y axes of said frames.

2. An assemblage as in claim 1 wherein x =y.

3. An assemblage as in claim 2 wherein the piece parts in each of said layers are identical.

4. An assemblage as in claim 3 wherein like-positioned piece parts in each of said layers include features for communication with features of next adjacent piece parts.

* * * * *